(12) United States Patent
Wang

(10) Patent No.: US 12,346,699 B1
(45) Date of Patent: Jul. 1, 2025

(54) SYSTEMS AND METHODS FOR AUTOMATING ADMINISTRATIVE SYSTEM PROCESSES

(71) Applicant: Datainfocom USA, Inc., Austin, TX (US)

(72) Inventor: Wensu Wang, Katy, TX (US)

(73) Assignee: DATAINFOCOM USA, INC., Austin, TX (US)

( * ) Notice: Subject to any disclaimer, the term of this patent is extended or adjusted under 35 U.S.C. 154(b) by 827 days.

(21) Appl. No.: 17/107,873

(22) Filed: Nov. 30, 2020

Related U.S. Application Data

(60) Provisional application No. 62/976,191, filed on Feb. 13, 2020.

(51) Int. Cl.
| | | |
|---|---|---|
| *G06F 9/00* | (2018.01) | |
| *G06F 9/38* | (2018.01) | |
| *G06F 9/48* | (2006.01) | |
| *G06F 16/9032* | (2019.01) | |
| *G06F 16/9035* | (2019.01) | |
| *G06F 18/214* | (2023.01) | |
| *G06F 40/20* | (2020.01) | |
| *G06N 20/00* | (2019.01) | |
| *G06Q 40/08* | (2012.01) | |

(52) U.S. Cl.
CPC .......... *G06F 9/3836* (2013.01); *G06F 9/4881* (2013.01); *G06F 16/90332* (2019.01); *G06F 16/9035* (2019.01); *G06F 18/214* (2023.01); *G06F 40/20* (2020.01); *G06N 20/00* (2019.01); *G06Q 40/08* (2013.01)

(58) Field of Classification Search
CPC ............ G06F 9/3836; G06F 16/90332; G06F 16/9035; G06F 40/20; G06F 18/214; G06F 9/4881; G06Q 40/08; G06N 20/00
See application file for complete search history.

(56) References Cited

U.S. PATENT DOCUMENTS

| | | |
|---|---|---|
| 6,151,608 A | 11/2000 | Abrams |
| 9,996,799 B2 | 6/2018 | Bostick et al. |

(Continued)

OTHER PUBLICATIONS

U.S. Appl. No. 17/110,247, filed Dec. 2, 2020 (WANG).
U.S. Appl. No. 17/687,632, filed Mar. 5, 2022 (WANG).
U.S. Appl. No. 17/715,729, filed Apr. 7, 2022 (WANG).

*Primary Examiner* — Scott S Trotter
(74) *Attorney, Agent, or Firm* — Chad Peterson

(57) ABSTRACT

Methods, systems and apparatuses, including computer programs encoded on computer storage media, are provided for converting legacy administration systems by transforming core business processes identified from the legacy administration systems and building unified data structures among the integrated administration systems within an organization. The legacy systems are analyzed to determine common and/or needed system configuration, including common core business processes and specific processes, data structures, data definitions, calculation modules, product rules, etc. The legacy systems are then transformed by converting core business processes one by one and additional specific processes. A unified data structure, such as a customer-centralized data model, is created to be used by all administrative systems within an organization to improve operation efficiency, result accuracy, and process transparency.

8 Claims, 16 Drawing Sheets

(56) References Cited

U.S. PATENT DOCUMENTS

| | | |
|---|---|---|
| 10,346,454 B2 * | 7/2019 | Moeller-Bertram .... G06F 15/76 |
| 11,086,549 B2 | 8/2021 | Ramakrishnan et al. |
| 11,790,262 B2 * | 10/2023 | Ghatage ................ G06N 20/00 |
| | | 706/12 |
| 2002/0138449 A1 | 9/2002 | Kendall et al. |
| 2003/0041059 A1 | 2/2003 | Lepien |
| 2007/0288535 A1 | 12/2007 | Shitomi et al. |
| 2009/0119476 A1 | 5/2009 | Jernigan et al. |
| 2013/0132285 A1 | 5/2013 | Richards et al. |
| 2015/0019476 A1 | 1/2015 | Hiatt et al. |
| 2015/0019488 A1 | 1/2015 | Higginson et al. |
| 2017/0352041 A1 * | 12/2017 | Ramamurthy ......... G06N 5/043 |
| 2018/0322396 A1 * | 11/2018 | Ahuja-Cogny ........ G06N 5/022 |
| 2019/0065523 A1 | 2/2019 | Singh et al. |
| 2019/0197171 A1 | 6/2019 | Tiwari et al. |
| 2020/0012970 A1 | 1/2020 | Srivastava et al. |
| 2020/0257540 A1 | 8/2020 | Moreno et al. |

\* cited by examiner

SYSTEMS AND METHODS FOR AUTOMATING ADMINISTRATIVE SYSTEM PROCESSES

CROSS-REFERENCE TO RELATED APPLICATIONS

The present application claims the benefit of U.S. Provisional Patent Application No. 62/976,191, entitled "SYSTEMS AND METHODS FOR AUTOMATING ADMINISTRATIVE SYSTEM PROCESSES." filed Feb. 13, 2020, which is incorporated by reference herein in its entirety.

BACKGROUND

This specification relates generally to Artificial Intelligence (AI) technologies as applied to transforming common administrative systems, such as insurance Policy Administration Systems (PAS), using the latest data-driven architectures and technologies. Currently, many businesses rely on cumbersome legacy administration systems with deprecated technologies, siloed and unscalable data structure, and manually intensive processes that are error-prone and difficult to scale. There exists a need to redesign the entire business process architecture with AI-enabled systems to make these processes more intelligent and adaptive to improve operation efficiency, result accuracy, and process transparency.

SUMMARY

In accordance with the foregoing objectives and others, exemplary methods and systems are disclosed herein to convert legacy systems by transforming core business processes identified from legacy policy administration systems and building unified data structures among the integrated administration systems within an organization.

One embodiment is directed to a method for automating one or more product or policy administration systems, the method comprising: generating a shared database structure; automating at least one shared process using at least one artificial intelligence (AI) technique, one robotic process automation (RPA) technique, or a combination of at least one AI technique and at least one RPA technique; and automating at least one additional process.

Another embodiment is directed to a system comprising one or more processors and one or more storage devices storing instructions that when executed by the one or more processors cause the one or more processors to perform operations comprising: generating a shared database structure; automating at least one shared process using at least one artificial intelligence (AI) technique, one robotic process automation (RPA) technique, or a combination of at least one AI technique and at least one RPA technique; and automating at least one additional process.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Various methods and systems are disclosed to enhance automatic processing of various legacy system conversion tasks using various artificial intelligence (AI) and robotic process automation (RPA) techniques. AI techniques include, but are not limited to, machine learning (ML), deep learning, natural language processing (NLP) (including information extraction (IE)), natural language understanding (NLU), natural language generation (NLG), computer vision, speech recognition, signal processing, etc. Robotic process automation refers to the automation of repetitive tasks, thereby making the process less labor-intensive for humans.

As used herein, "historical data" refers to a data set used to train or otherwise create a model, and generally includes multiple training instances, each instance comprising one or more feature inputs and a target output. The target output of a training set may also be referred to herein as a "label." "Current data" or "current input data" refers to data input into the trained model to generate a prediction, forecast, or other output.

AI models include one or more of the following: classification models, regression models, Markov chains, time series models, state space models, Bayesian models, decision trees (including boosted decision trees), neural networks, deep neural networks, convolutional neural networks, recurrent neural networks, long short term memory (LSTM) neural networks, kNN models, Prophet models, support vector machines, or any other appropriate model, or combinations or ensembles (e.g., by bagging, boosting, random forest techniques) thereof. To train an AI model, the system will generally use a set of historical data, including input variables and a target. Multiple models with different hyperparameters may be created and evaluated to select a preferred model. In one embodiment, a hyperparameter autotuning system may be used to create, test, and select preferred models. Any created models may be periodically retrained using additional historical data and/or an evaluation of the outputs or predictions of the models to be retrained.

Natural language generation (NLG) refers to AI techniques for generating human-readable text from structured data. Such techniques include, but are not limited to, template-based text generation, trained NLG models, etc.

Natural language processing (NLP), natural language understanding (NLU), and natural language information extraction (IE) refer to AI techniques for extracting data from text. These techniques include a set of natural language processing algorithms, including but not limited to, tokenization, word stemming, grammar analysis, bagging of words, term frequency-inverse document frequency (TF-IDF), latent dirichlet allocation (LDA), topic modeling, sentiment analysis, semantic analysis (e.g., doc2vec), keyword identification, bi-directional attention flow (Bi-DAF) networks, etc., to extract information from the text and convert it into a structured format.

Figure 1:
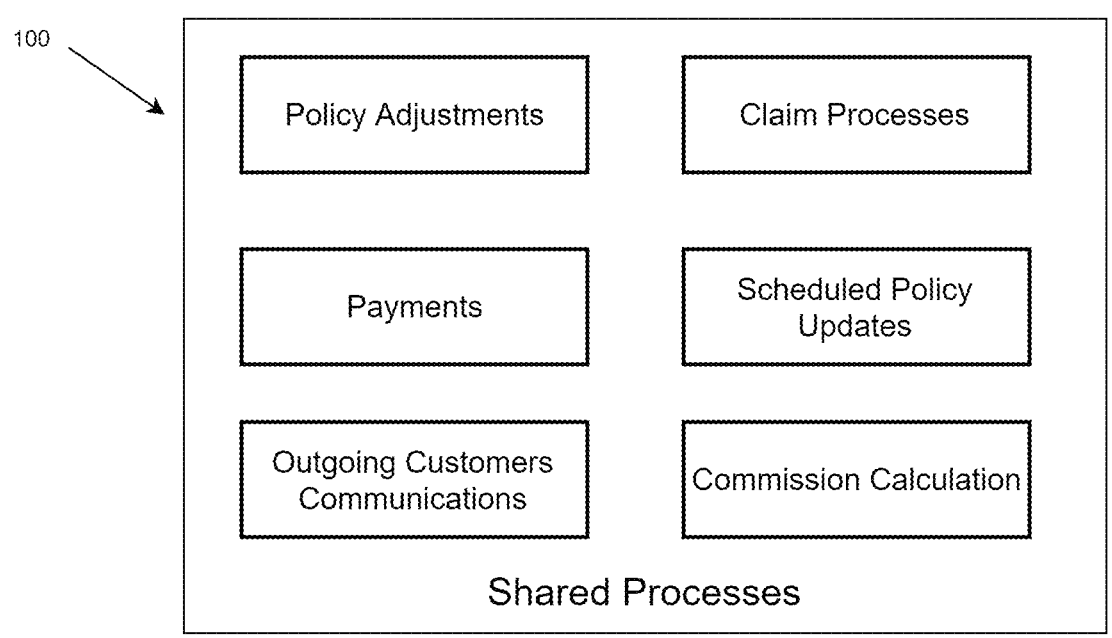
FIG. 1 illustrates an example of administrative system core processes.

The methods and systems described herein provide for the step-by-step conversion of legacy systems (e.g., ALIS, InsPro, DXC Cyberlife, DXC Graphtalk, DXC Ingenium, iWorks, etc. in the insurance industry) to a set of streamlined, efficient processes. As shown in FIG. 1, PAS systems share many common core processes and have related data in various processes. FIG. 1 illustrates administration system processes for insurance providers, but the principles disclosed herein can be used to automate common tasks found in legacy systems used in other industries. In one embodiment, a system and method is disclosed to build a uniform database structure for the administration system and automate each of the administration system processes one by one. The systems and methods may also be used to merge separate administration systems, by identifying the common processes shared by the separate administration systems, automating each common process, automating each special process (processes not shared in common with other administration systems) and merging the separate PAS databases.

The methods and systems are useful for a wide range of insurance and investment products, including life insurance (term and whole), disability insurance, casualty insurance, income protection insurance, employment insurance, annuities, etc., as well as products in other industries. These products involve similar types of processes related to policy administration or interaction and communication with customers, including altering (e.g., increasing or decreasing) insurance coverage, increasing or decreasing contributions (e.g., for an investment product), billing, receiving payments or contributions, making payments (e.g., paying out on a policy retirement date, benefit payments), processing claims, making inflation adjustments to benefits, sending various communications (e.g., annual statements, policy schedules, payment notices, etc.), calculating and paying agent commissions, calculating premiums, etc.

The methods and systems described herein are able to use and synthesize all available data related to the specific administrative system tasks, particularly insurance-related tasks, convert any relevant unstructured data into structured data, automatically identify relevant insurance policy documents and extract relevant information from the document, and automatically perform any other necessary processing, e.g., making the alteration to the policy, making the benefit payment, etc.

Figure 17:
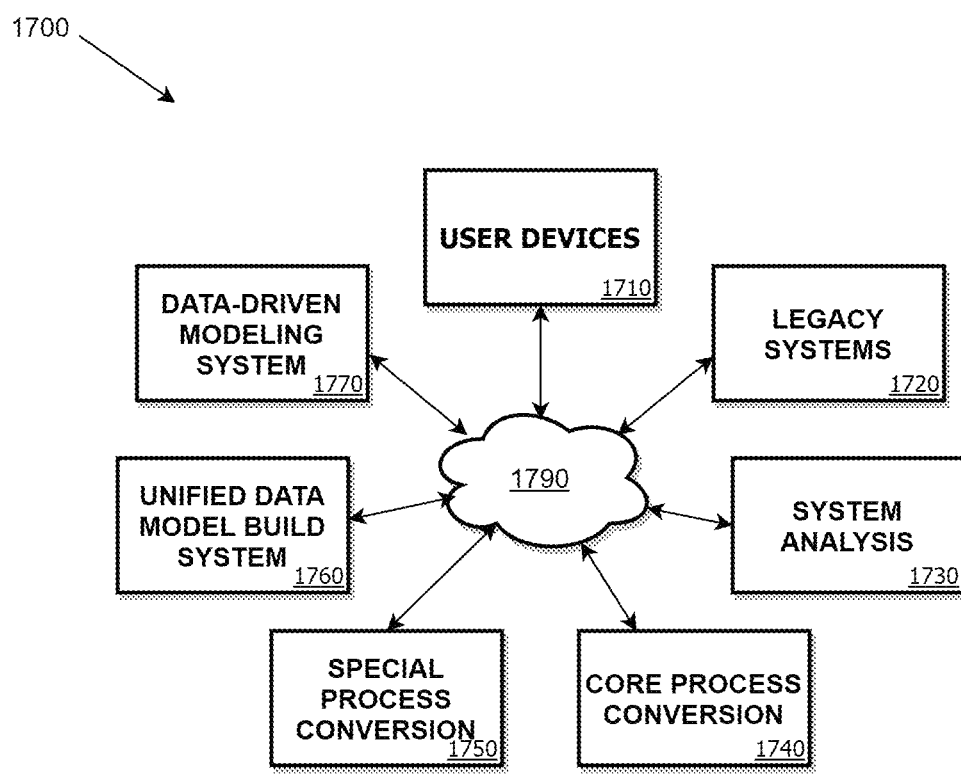
FIG. 17 is a block diagram of a system for converting legacy systems by transforming core business processes identified from legacy policy administration systems and building unified data structures among the integrated administration systems within an organization.

Referring to FIG. 17, a block diagram of an exemplary system 1700 for use in conversion of the legacy administration systems is illustrated. The conversion system may include user devices 1710, one or more legacy administration systems 1720, a system analysis module to identify core processes and special processes in the legacy systems 1730, a core process conversion system 1740, a special process conversion system 1750, a unified data model 1760, and a data-driven modeling system 1770. The system components may be remote from each other and interact through a communication network 1790. Non-limiting examples of communication networks include local area networks (LANs), wide area networks (WANs) (e.g., the Internet), etc.

In certain embodiments, a user may access any of the other systems via a user device 1710 connected to the network 1790. A user device 1710 may be any computer device capable of accessing any of the other systems, such as by running a client application or other software, like a web browser or web-browser-like application.

The administrative system analysis module 1730 is adapted to analyze a system to determine its core business process, special processes, and other specifications, including the system configuration, data structures, data definitions, calculation modules, product rules, business functions, etc. The system analysis module is also adapted to determine types of customer information required by the administrative system.

The core process conversion system 1740 is configured to build a workflow to convert the identified core processes in the legacy systems one by one.

The special process conversion system 1750 is configured to convert all remaining special processes in each legacy system and ensure each legacy system is fully converted. The conversion systems (1740, 1750) ensure that the converted system includes similar business process functionality as the legacy systems. The converted system will have any necessary data structures, data definitions, calculation modules, product rules, and business processes needed.

The unified data model build system 1760 is configured to build a common data structure, for example, a customer centralized data model, which is universal and can be adapted for all administrative systems within an organization.

The data-driven modeling system 1770 includes one or more systems that work together to train or otherwise create (for types of models that do not require training (e.g., kNN)) prediction models. The data modeling system may be adapted to create any type of model, including but not limited to, classification models, regression models, Markov chains, time series models, state space models, Bayesian models, boosted decision trees, neural networks, convolutional neural networks, recurrent neural networks, LSTM neural networks, or any other appropriate model, or combinations or ensembles thereof. To train a model, the model creation system will generally use a set of historical data, including input variables and a target. Multiple models with different hyperparameters may be created and evaluated to select a preferred model. In one embodiment, a hyperparameter autotuning system may be used to create, test, and select preferred models. The data modeling system may also include systems adapted for cleaning, segmenting, processing, and/or aggregating data for use in training the models; systems adapted to extract features from unstructured data, such as written text, images, video, recorded audio, etc.;

systems adapted to update and/or retrain models; and systems adapted to reduce the number of variables in a data set.

Figure 2:
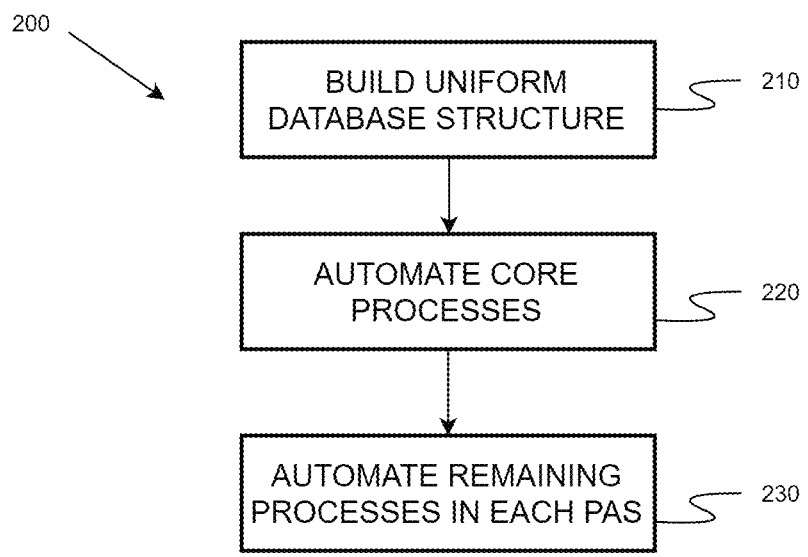
FIG. 2 illustrates an example method for converting administrative system(s).

FIG. 2 illustrates an example method 200 for converting administration system(s). In step 210, a uniform database structure is created that supports each task of the administration system(s). The database structure is also designed to support various graphical interfaces for users of the administration system, e.g., customers, adjusters, etc.

In step 220, core processes that are shared between administration systems are converted. Such processes can include any of the processes described herein with respect to insurance/investment product providers, but are not limited to such. For each process, the process is automated using one or more AI techniques described herein. The AI techniques used to automate each process are determined based on the nature of the process. For example, NLP or NLU techniques can be used is processes where any text is provided as an input or where any information relevant to the process is found in a text document. NLG techniques can be used in processes where any text is communicated to a person, e.g., a customer, adjuster, agent, etc. RPA can be used in any rule-based process. AI modeling techniques can be used in any process that requires a classification (e.g., a classification model) or a value (e.g., a regression model) to be calculated.

In step 230, the remaining (special) processes are converted using special process conversion system 1750, also using one or more AI techniques described herein.

Figure 3:
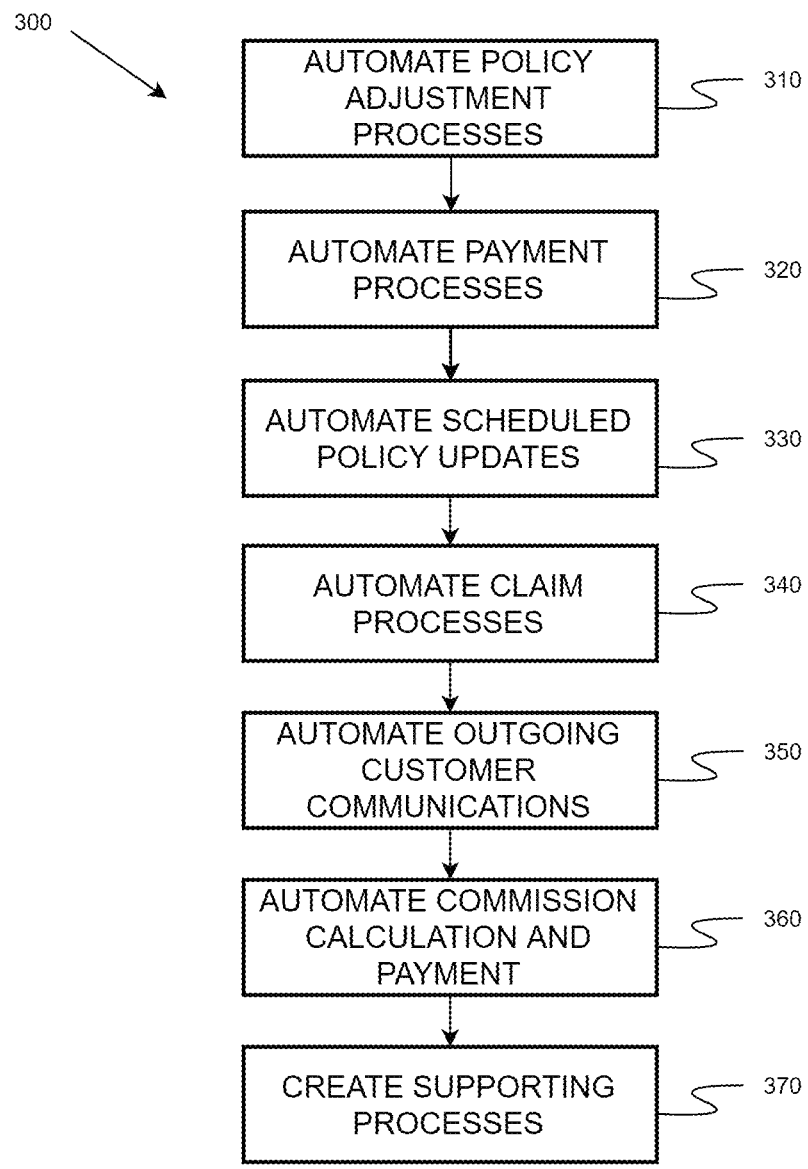
FIG. 3 illustrates one example of a method for administration system conversion for insurance/investment product providers.

FIG. 3 illustrates one example of a method 300 for converting legacy administration systems for insurance/investment product providers. In step 305, data structures and/or databases that are shared between all processes are created. This step may use the system analysis module 1730 to identify common data structures, data definitions, and required information for each of the legacy PAS. Based on these common structures and definitions, the unified data model build system 1760 creates the underlying data structures, etc., for the conversion.

In step 310, policy adjustment (e.g., coverage increase, coverage decrease, etc.) processes are automated using core process conversion system 1740.

In step 320, payment processes, including incoming payments, outgoing payments, and billing, are automated using core process conversion system 1740.

In step 330, scheduled policy updates, e.g., yearly inflation adjustments, are automated using core process conversion system 1740.

In step 340, claim processes, e.g., paying on a claimed benefit, are automated using core process conversion system 1740.

In step 350, outgoing communications to customers, e.g., updated schedules, annual statements, are automated using core process conversion system 1740.

In step 360, commission calculation processes and payments are automated using core process conversion system 1740.

In step 370, any necessary or useful supporting processes may be generated. Such supporting processes may include, e.g., a process for automatic identification of documents, a process for automatic determination of the profitability of accounts, etc.

Figure 4:
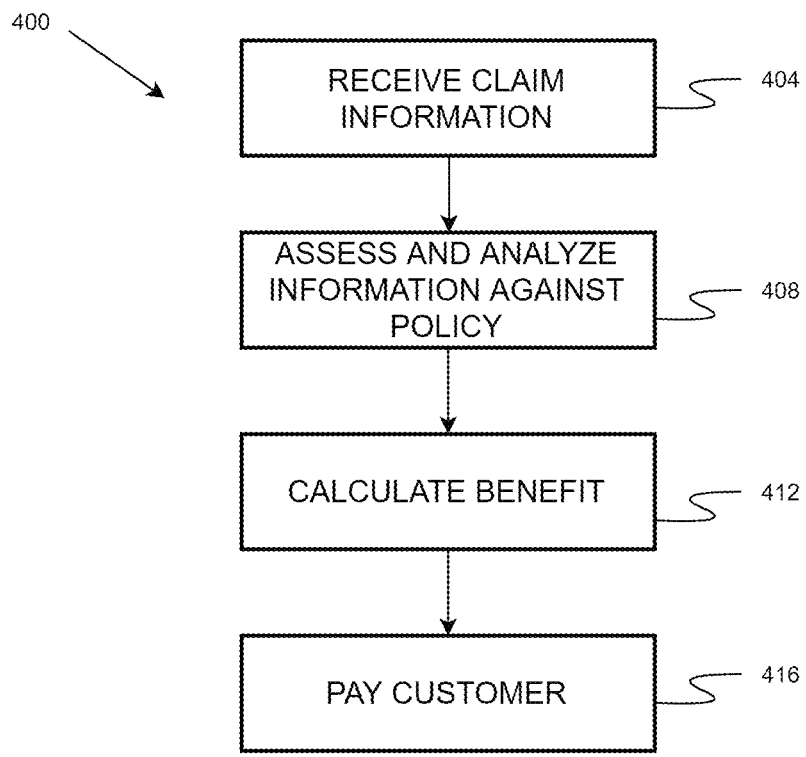
FIG. 4 illustrates an example method for automatically processing and paying a claimed benefit.

FIG. 4 illustrates an example method 400 for automatically processing and paying a claimed benefit, and is an example of an automated process that may be created in step 340. Such benefits may be based on an insurance policy or investment vehicle, e.g., income protection insurance, total and permanent disability insurance, trauma and/or life insurance, etc. In one embodiment, the disclosed automatic solution for benefit processing comprises of four components: data input, information retrieval, benefit calculation, and benefit payments. One or more AI models are embedded in each component to automate data inputs, information retrieval/extraction, calculations, payments, and any necessary reviews.

In step 404, claim information is received. Such information may include unstructured data and structured data in various formats. Unstructured data may include text documents (e.g., paper or electronic claim forms, claim notes, medical reports, claimant financials, etc.), images (e.g., of injuries), audio recordings (e.g., of a phone conversation with the claimant), etc. The unstructured claim information is converted to a machine readable format if necessary (e.g., paper documents are scanned), then analyzed to extract applicable information. Claim data may also be received in structured formats, e.g., information retrieved from a customer database.

Claim data may include policyholder variables (e.g., personal data, financial data, asset data, claim history data, etc.) for the relevant policy, policy data for the relevant policies, and data related to the current claim and claimant. Policyholder variables may also include policy deductibles, policy discounts, policy limits, premium development history, vehicle and driver counts, household violation or incident history, and the policyholder credit score or other information regarding policyholder's financial status or history. The policy variables may include all information relating to the policy, e.g., type, term, effective data, coverages, etc.

The claimant variables may include all information relating to the claimant, e.g., identity of the claimant, indemnity payouts, submitted bills, medical history, prior claim history, prior injury history, etc.

The claim variables may include all information relating to the claim, e.g., identity of the claimant and the insured, claim status, claim history, claim payouts, submitted medical bills, and any other information relevant to the claim.

After the claim data is received, it is cleaned, joined together, and variable reduction techniques are applied as necessary, then input into a trained classification model to identify the type of claimed benefit, e.g., total or partial disability under Income Protection claims, etc. The classification model will have been previously trained using historical claim data and any applicable external data to predict the claim benefit type.

In step 408, the received claim data is analyzed with respect to the applicable policy. The applicable policy (based on the predicted claim benefit type) is retrieved, and then relevant benefit documents are located, including policies, policy options, policy upgrades, pass-backs, etc. Policy benefit information is then extracted using NLP techniques from the retrieved policy documents, including, but not limited to, policy terms, conditions, benefit calculation formulae, etc.

In step 412, the benefit is calculated based on the extracted terms, conditions, and formulae, and received claim data.

In step 416, the payment to the customer is made. In an embodiment, the payment may be reviewed by a case worker and/or manager prior to the payment being made. In this case, the proposed payment is automatically sent to the case manager for review and, upon approval, automatically sent to the customer. Any necessary reports can also be generated automatically.

The AI-enabled workflow automates the benefit payment process, making it more transparent, and reducing error rates compared with manual processes.

Figure 5:
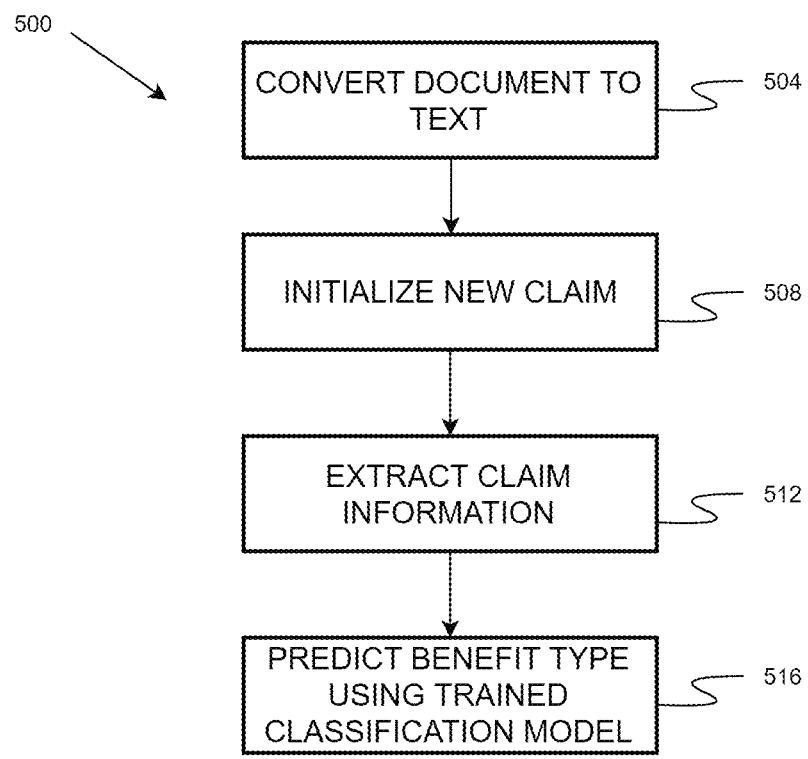
FIG. 5 illustrates an example method for receiving and extracting claim information.

FIG. 5 illustrates an example method 500 for receiving and extracting claim information (see FIG. 4 at 404). In step 504, any non-computer readable documents are converted to a computer-readable form, e.g., paper documents are scanned into the system (e.g., as PDF files) and converted into text. The conversion may be aided by policy document metadata and document templates.

In step 508, a new claim is initialized in the system if necessary. In step 512, the claim data can be extracted from the received claim documents using natural language processing (NLP) techniques.

In step 516, a trained classification model in then run using the claim data as input to predict the claim benefit type, e.g, total disability, partial disability, etc. The classification model is previously trained using historical claim data as the input and historical claim benefit type data as the target.

Data may be similarly extracted from other received documents, including received income documents, etc.

Figure 6:
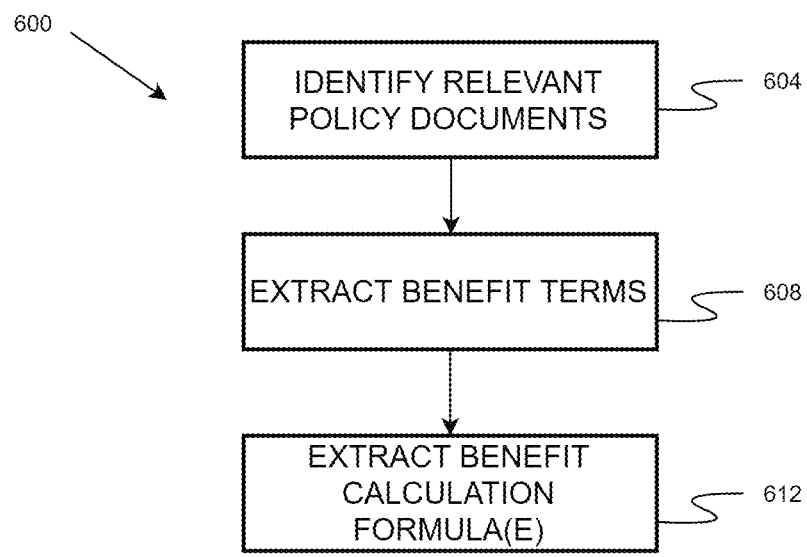
FIG. 6 illustrates an example method for assessing and analyzing claim information against a policy.

FIG. 6 illustrates an example method 600 for assessing and analyzing claim information against the policy (see FIG. 4 at 408).

In step 604, relevant policy document are identified. Relevant inputs (e.g., benefit type (as predicted by method 500), date of occurrence, insurance schedule, etc.) may be used to query a database or otherwise identify applicable documents, which may include policies, options, upgrades, pass-backs, etc. A pass-back refers to previous version of policy which is still effective in some insurance policies. For a policy with a pass-back policy, the more favorable version is applied to the policy holder. Because of this, multiple versions of documents may be retrieved.

In step 608, after the benefit type is identified and policy documents are retrieved, an NLP engine is activated to search the textual data of the documents for clauses with relevant terms. The NLP engine will have been previously trained, e.g., through tokenization, stemming, grammar, semantic analysis, topic analysis, etc. The NLP engine identifies and outputs policy clauses highly related to the claims.

In step 612, the benefit formula is extracted from the extracted policy clauses using similar NLP information extraction techniques. If multiple policy documents were retrieved, multiple benefit formulae will be extracted.

Figure 7:
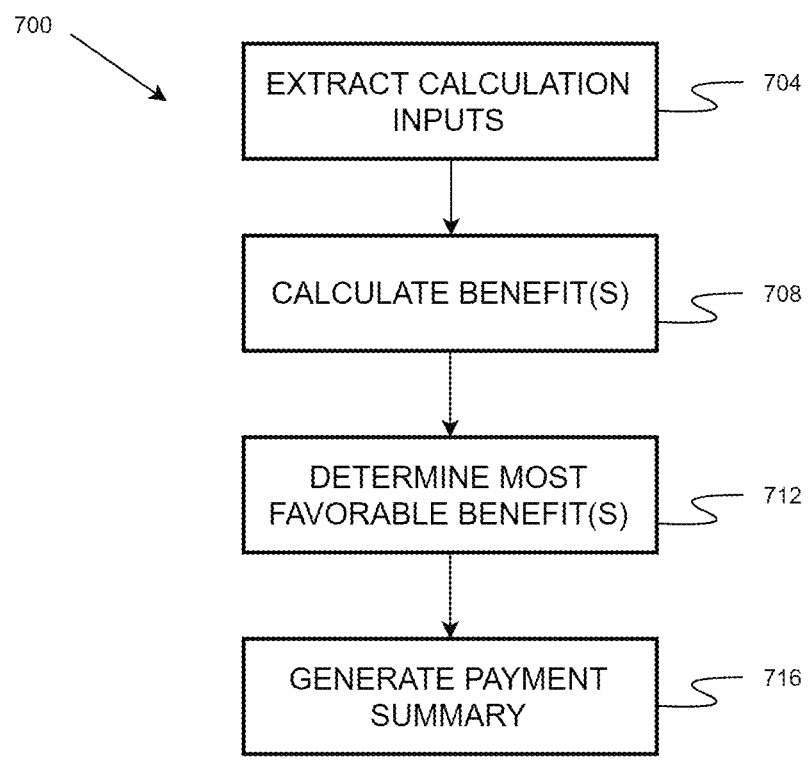
FIG. 7 illustrates an example method for calculating a benefit amount.

FIG. 7 illustrates an example method 700 for calculating a benefit amount (see FIG. 4 at 412). In step 704, required inputs for the calculation are extracted from the available data, including the extracted claim data (see FIG. 5), the extracted policy data (see FIG. 6), and existing customer data, e.g., from a database.

In step 708, the benefit is calculated using the inputs and the formula extracted in step 612. If there are multiple relevant formulae (e.g., there are one or more pass backs), the benefit amount for each formula is calculated.

In one embodiment, a separate calculation module can be implemented with a web-based interface. The web-based interface may include one or more web forms that accept customer data, customer income data, policy data, claim data, benefit data, etc. After the data is input, the calculation module calculates the benefit.

In step 712, for those cases with an applicable pass-back policy, the most favorable payment will be determined. In step 716, a payment summary is automatically generated, based on the calculated benefit and policy terms.

Figure 8:
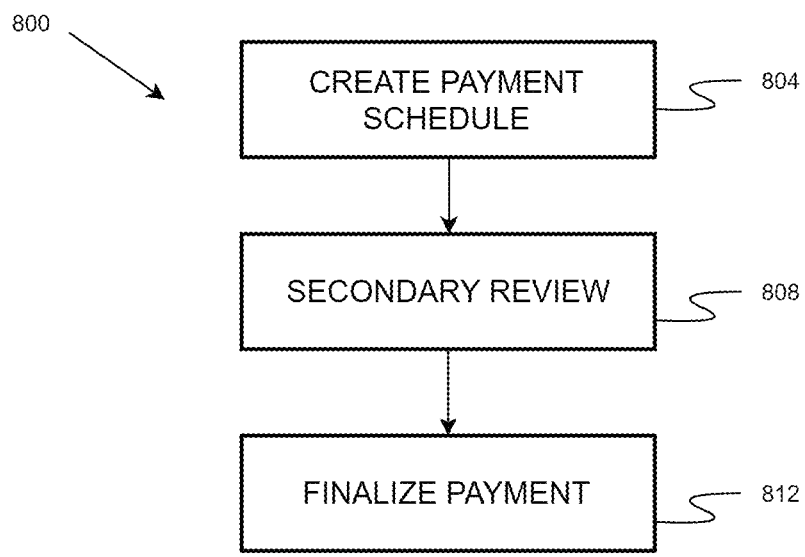
FIG. 8 illustrates an example method for making a payment.

FIG. 8 illustrates an example method 800 for making a payment (see FIG. 4 at 416). In step 804, a payment schedule is automatically generated. After the payment schedule is generated, a case manager can review the claim, including the payment schedule, in step 808. In step 812, after approval by the case manager, the payment schedule is finalized.

The method for making a benefit payment uses both unstructured and structured data in analyzing the claim. Unstructured data is converted to a computer-readable form if necessary, then processed using natural language processing/information extraction and AI techniques to identify and extract relevant information. AI techniques may also be used to categorize input information. The relevant unstructured and structured data is then combined together and input into one or more AI-enabled automatic processes, such as an AI model or a natural language generation model. This general process may be followed for additional workflows related to insurance and/or investment products, including:

Integrating and consuming data from various data sources.

Automatically processing and classifying incoming documents.

Filling and validating input data.

Extracting information from documents in various formats.

Processing payments.

Updating accounts.

Generating text reports.

Processing claims end-to-end.

Making inflation adjustments to products.

Managing billing, payments, and commissions.

Assessing account profitability.

Additional AI-enabled processes that may be generated by the process described with respect FIG. 3 are described below.

Figure 9:
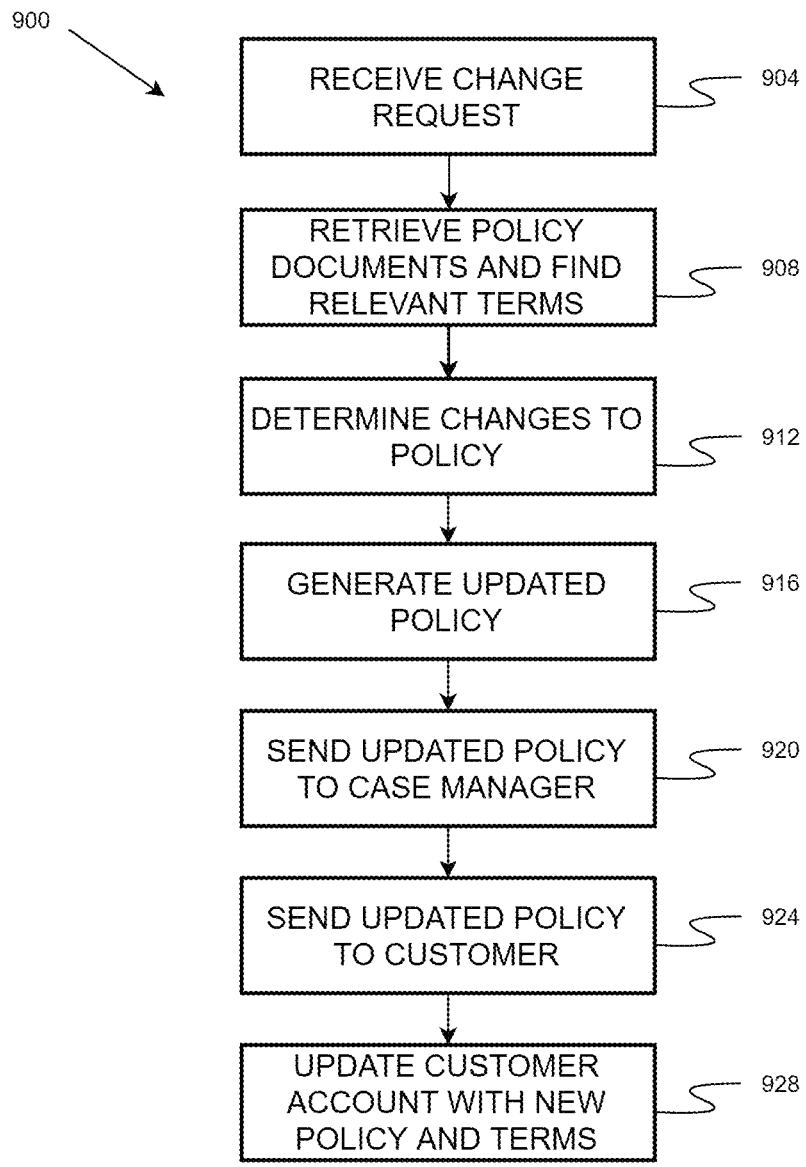
FIG. 9 illustrates an example method for automatically making an update to an insurance/investment policy.

FIG. 9 illustrates an example method 900 for automatically making an update to an insurance/investment policy, e.g., when customers update a policy during the policy term or upon renewal. This is an example of an automated process that may be created in step 310. For example, a customer may change the retirement date, alter the payment schedule, increase or decrease coverage, or even cancel the policy. These customer-initiated changes may cause other changes, e.g., the required investment by the insurance company, the provided coverage, the associated premium, etc.

In step 904, a new change request is received from a customer, and the system uses a trained AI classification model to classify the change request, e.g., as an alteration, an increase, or a decrease.

In step 908, the policy documents are retrieved, and relevant policy terms are retrieved from the policy documents and/or the customer's account by a NLP information extraction module, similar to as described with respect to FIG. 6.

In step 912, the new premium and other changes are calculated or otherwise determined.

In step 916, an updated policy and optionally a new account summary are automatically generated using NLG techniques.

In step 920, the updated policy is sent to a case manager for review.

In step 924, after approval by the case manager, the updated policy is automatically sent to the customer for approval.

In step 928, after approval by the customer, the customer's account is updated with the new policy.

Figure 10:
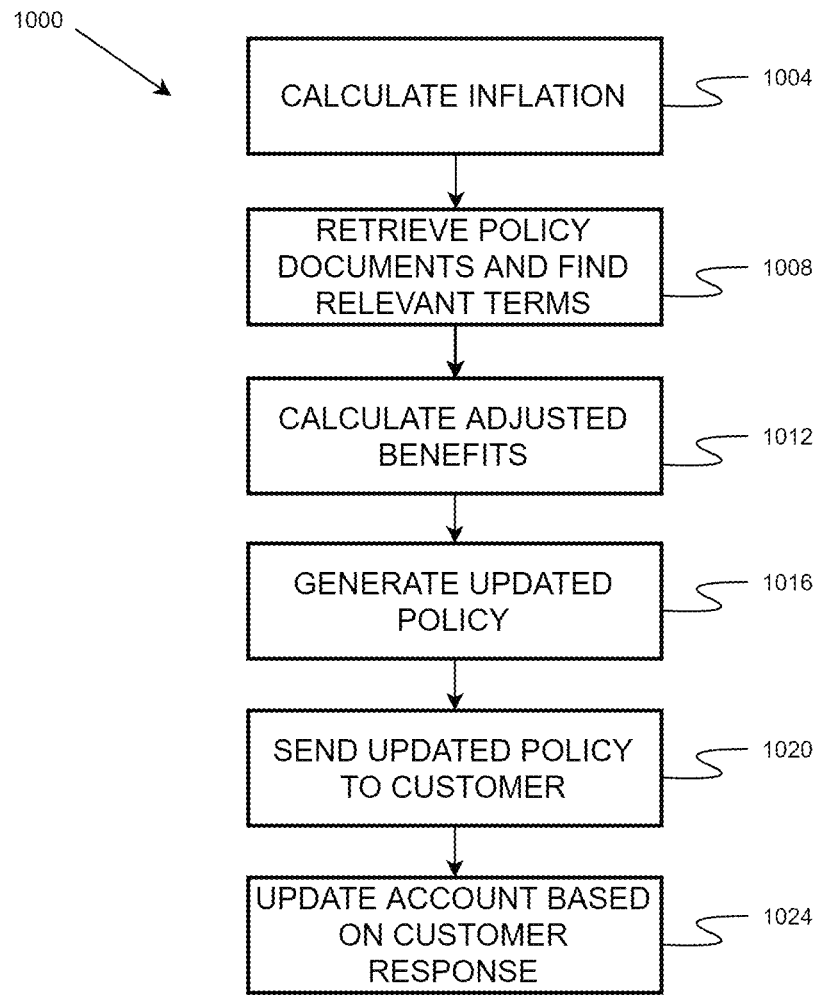
FIG. 10 illustrates an example method for making a CPI inflation adjustment to customer benefits.

FIG. 10 illustrates an example method 1000 for making a CPI (consumer price index) inflation adjustment to customer benefits and other inflation sensitive amounts, and is an example of an automated process that may be created in step 330. This method provides a fully automated solution for making yearly (or other interval) inflation adjustments to policies.

In step 1004, an inflation metric is estimated. In one embodiment, the inflation metric may be next year's inflation. The inflation metric may be estimated by a machine learning model trained on prior inflation data, rules for estimating future CPI, or a combination.

In step 1008, benefit terms and amounts are extracted from customer account policy documents, similar to as described with respect to FIG. 6.

In step 1012, adjusted benefit amounts are calculated, based on the amounts extracted in step 1008 and the inflation rate calculated in step 1004.

In step 1016, an adjusted summary of benefits is generated using NLG techniques.

In step 1020, the adjusted summary is sent to the customer.

In step 1024, the customer's response is analyzed using NLP techniques. If the response is positive, the policy benefits are automatically updated.

Figure 11:
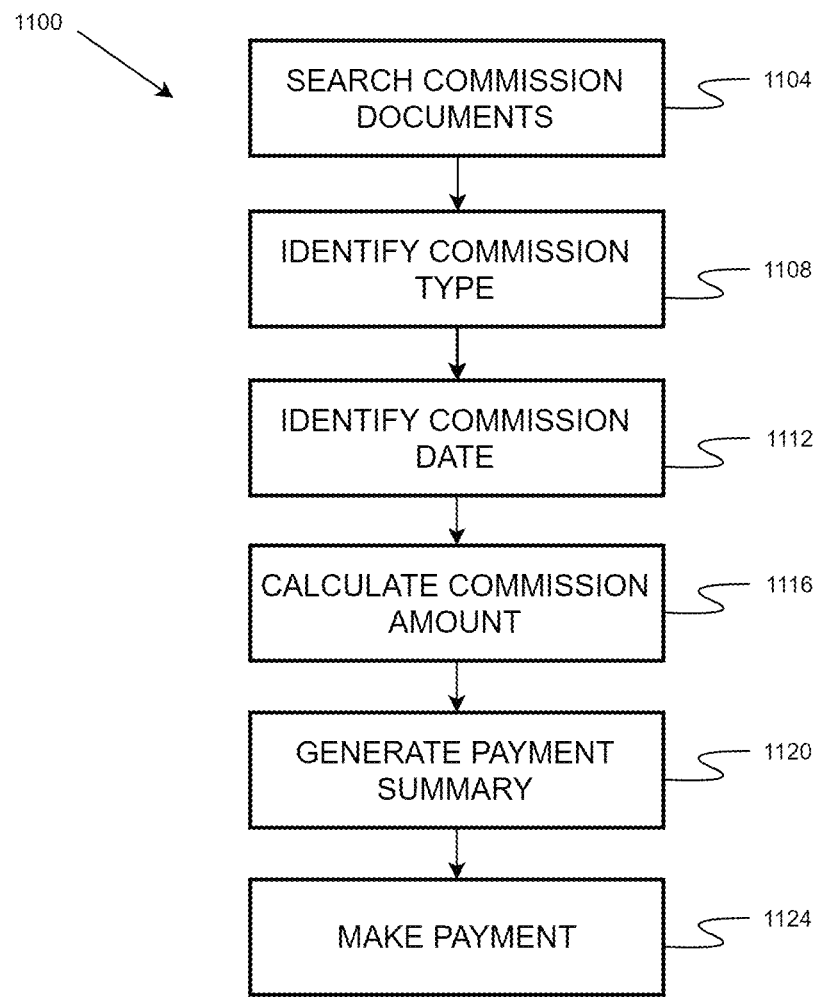
FIG. 11 illustrates an example method for making commission payments.

FIG. 11 illustrates an example method 1100 for making commission payments, and is an example of an automated process that may be created in step 360. This method provides a fully automated solution for commission calculation and payments, managing issues regarding commission eligibility and type, and payment amount and date.

In step 1104, commission documents are searched for relevant information using NLP techniques, as described with respect to FIG. 6.

In step 1108, the commission type is identified using NLP techniques.

In step 1112, the commission date is identified using NLP techniques.

In step 1116, the commission amount is calculated.

In step 1120, a payment summary is automatically generated using NLG techniques.

In step 1124, the commission payment is made.

Figure 12:
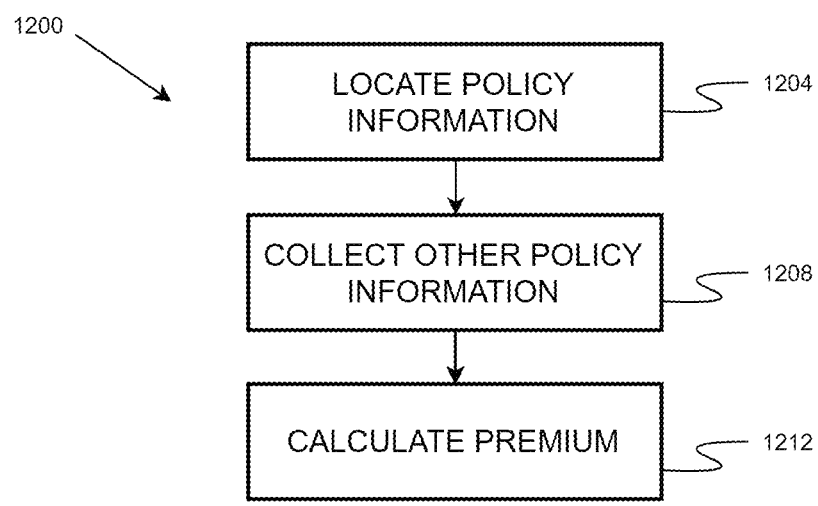
FIG. 12 illustrates an example method for premium calculation.

FIG. 12 illustrates an example method 1200 for premium calculation. In step 1204, the policy and policy related information is located. Such information can include data extracted from the policy itself, e.g., issue date, maturity date, effective date, expiration date, insured age and gender, etc. Such information can also include data retrieved from the account holder, e.g., payment information (e.g., frequency and method), etc. Data is extracted from unstructured data sources (e.g., the policy documents) using NLP techniques as described herein, e.g., with respect to FIG. 6.

In step 1208, additional policy-related information is gathered. Such information may include rules, discounts, waivers, stamp duty, etc.

In step 1212, the insurance premium is calculated based on the information gathered in steps 1204 and 1208.

Figure 13:
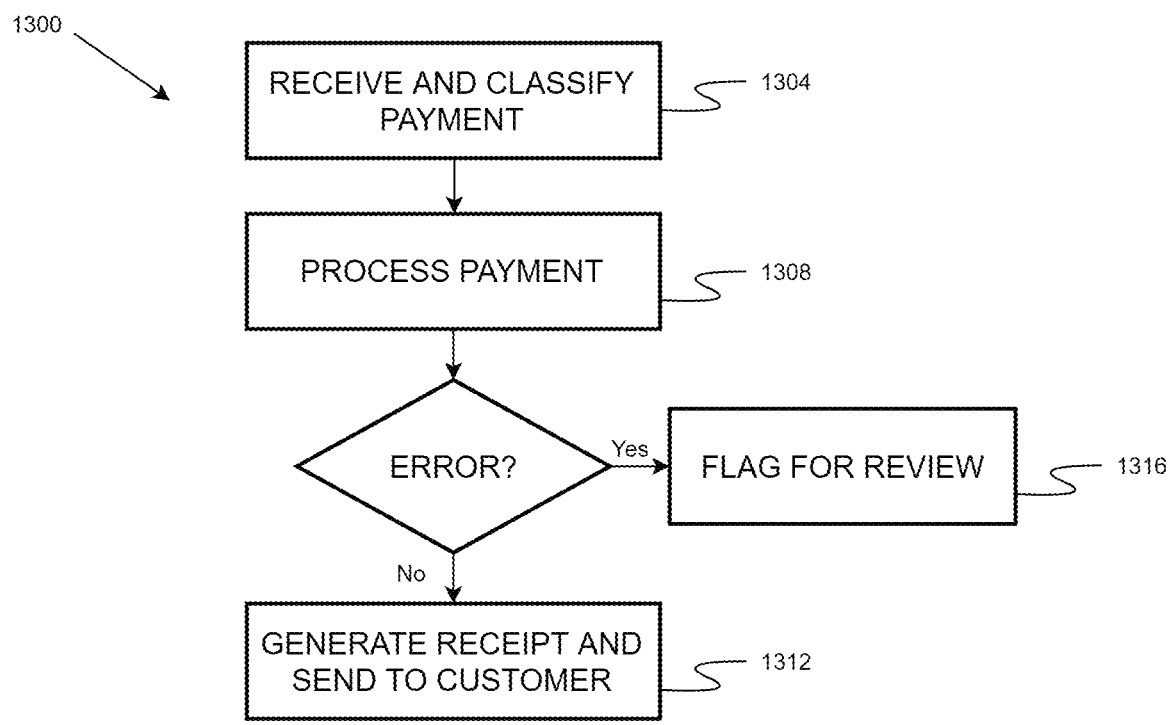
FIG. 13 illustrates an example method for automatic processing of payments.

FIG. 13 illustrates an example method 1300 for automatic processing of payments, and is an example of an automated process that may be created in step 320. In step 1304, the system receives the payment, and classifies it using a previously trained AI classification model. Classifications can include regular contribution, additional contribution, employer contribution, etc.

In step 1308, the system automatically processes the payment, and checks for errors. In step 1312, if there are no errors, the customer's account is updated, and a receipt is automatically generated (using NLG techniques) and sent to the customer. If there are errors, the payment is flagged for further review in step 1316.

A similar process can be used for billing, with the additional step of automatically generating a billing reminder notice for a customer using NLG techniques, and automatically sending the notice to the customer.

Figure 14:
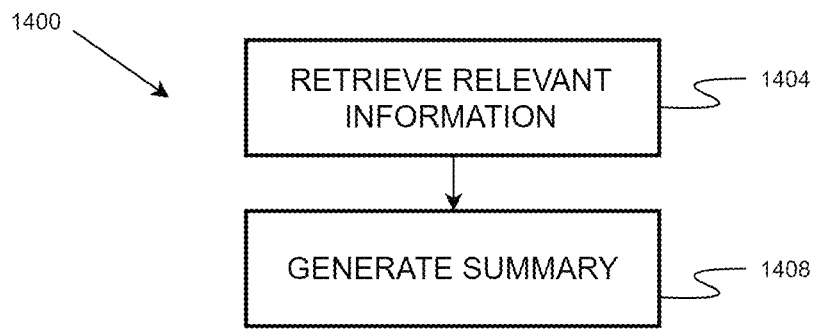
FIG. 14 illustrates an example method for automatically generating account summary statements.

FIG. 14 illustrates an example method 1400 for automatically generating account summary statements, and is an example of an automated process that may be created in step 350. Such statements may be sent on an annual or other basis. In step 1404, relevant account and policy details (e.g., payments or contributions, policy coverages, etc.) are retrieved from accounts and/or extracted from policy documents using NLP techniques, such as the NLP techniques discussed with respect to FIG. 6.

In step 1408, a trained NLG model is used to generate the annual statement.

Figure 15:
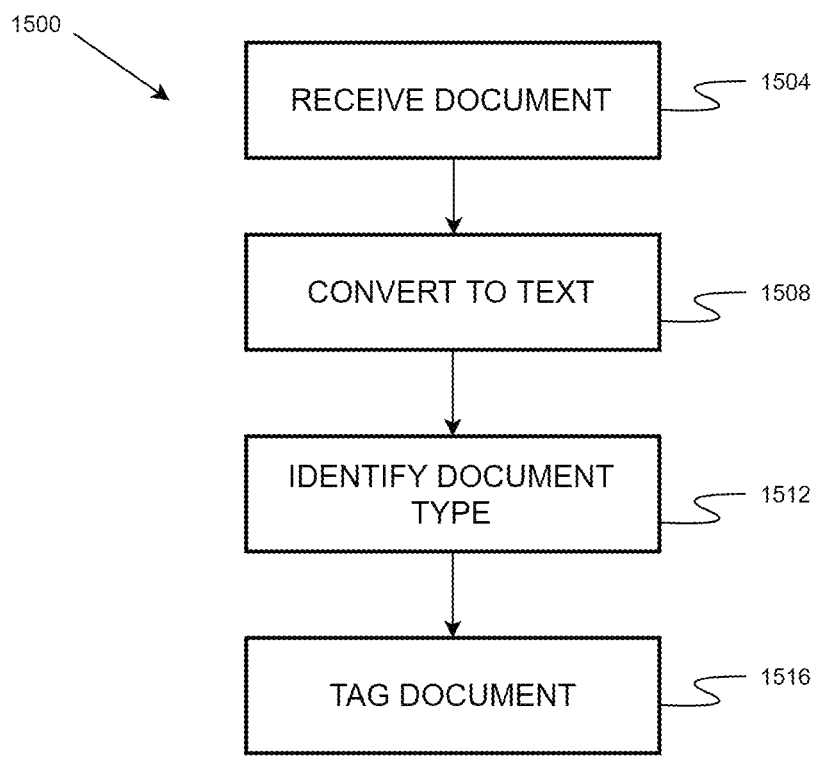
FIG. 15 illustrates an example method for automatic classification of documents.

FIG. 15 illustrates an example method 1500 for automatic classification of documents, and is an example of a supporting process that may be created in step 370. Documents to be classified can include document already in the system and incoming documents. In step 1504, an incoming (or already existing) document is received.

In step 1508, the received document is converted to text format.

In step 1512, the converted document is input into a machine learning model that has been trained to classify documents. The machine learning model is trained on tagged historical document data, with documents tagged with the document type, e.g., bill payment, policy change request, claim, etc.

In step 1516, the incoming document is tagged with the identified document type and/or saved in storage set aside for that document type.

Figure 16:
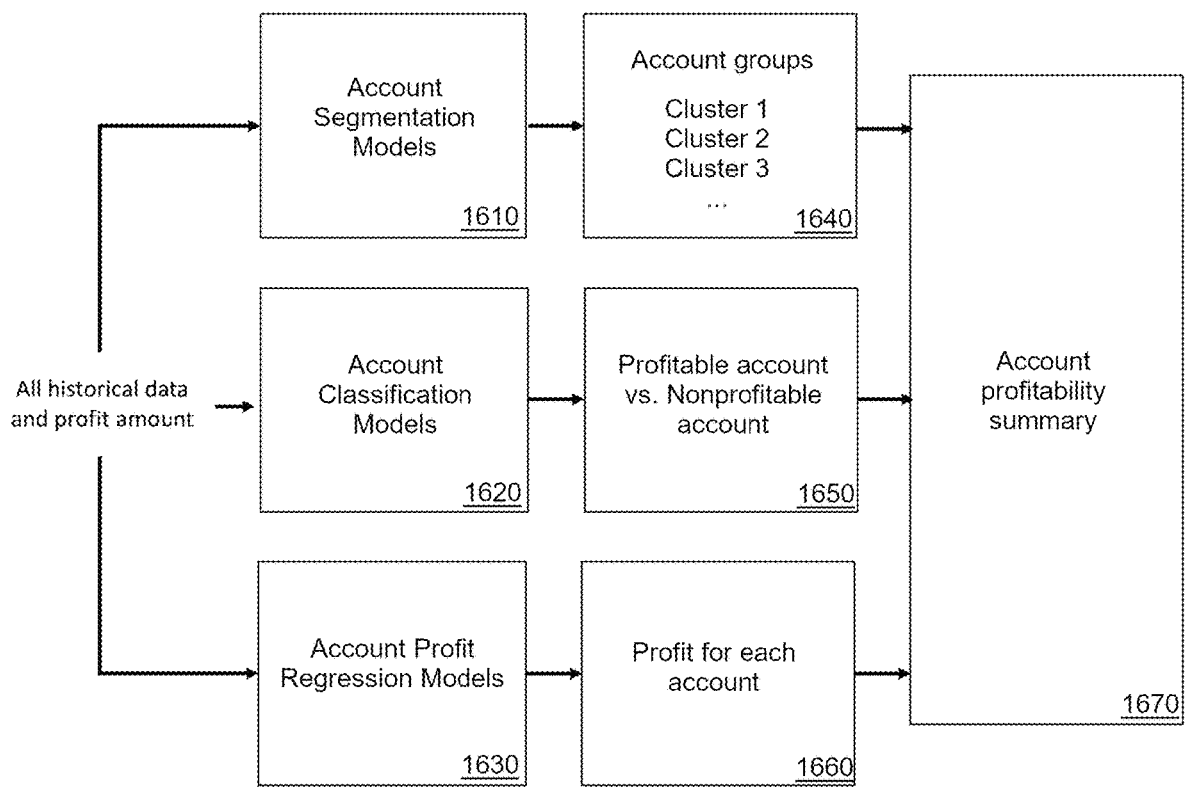
FIG. 16 illustrates an example method for automatic identification of profitable accounts.

FIG. 16 illustrates an example method 1600 for automatic identification of profitable accounts, and is an example of a supporting process that may be created in step 370. As illustrated, the inputs include all available historical data related to each account and the profit amount per account. The historical data is used to train at least three models: one or more account segmentation models 1610, one or more account classification models 1620, and/or one or more account profit regression models 1630.

The account segmentation model(s) are trained to divide the accounts into clusters based on profitability or other metrics, as shown in step 1640. The account classification model(s) are trained to identify profitable vs. non-profitable accounts, as shown in step 1650. The account profit regression model(s) are trained to calculate the profitability of accounts, as shown in step 1660. The outputs of each of the models may be used, separately or in combination, to generate an account profitability report or summary in step 1670, e.g., an account profitability summary for the subsequent year.

In some embodiments, one or more secondary policy reviews may be implemented in order to reduce the error rate. For example, the relevant policy clauses (e.g., as selected in method 600) may be manually reviewed, e.g., by a case officer or manager, to verify that the most relevant clauses were selected.

In summary, the above methods automate benefit payment processes to reduce human errors, e.g., from manually entering data, etc. Further, they leverage AI technology to reduce labor intensive work, monitor and supervise the process, and predict the outcomes.

Historical data used to train the AI models may first be cleaned, joined, segmented, aggregated, and/or feature engineered, as necessary. Cleaning the data involves, e.g., standardizing data types and values, removing duplicated variables, removing variables with a unique value, removing obviously non-predictive variables (e.g., user id, etc.), etc.

Joining data involves collecting related data together via a common key, so data for relevant real world entities (e.g., policyholders, claimants, etc.), events (e.g., claims), etc., are associated.

Segmenting data relates to dividing the data into groups based on a common characteristic, e.g., geographic area, age, etc. Such groups are preferably segmented based on a characteristic that is more deterministic with respect to the target of the model than other characteristics.

To the extent necessary, data is aggregated to a desired granularity. The appropriate granularity will depend on the type and structure of the input variables, the target, the quantity and volatility of the input variables, and other factors.

Data to be used in training models may be extracted from unstructured data sources, e.g., text, images, videos, audio recordings, etc. For example, for unstructured text sources, the extracted features may be related to the sentiment of the text (e.g., using sentiment analysis), topics discussed in the text (e.g., using topic modeling), presence of keywords, context analysis, and other types of natural language processing or textual analysis. For images, the extracted features may be related to foreground objects, background objects, etc. For audio recordings, the extracted features may be related to sentiment (e.g., using tonal analysis), etc.

In some embodiments, the number of potential input variables may number in the thousands, and it would be impractical to train AI models using all of the variables. In such embodiments, feature engineering techniques may be used to reduce the number of variables. For example, variables with incomplete or sparse data, variables with low variance, highly correlated variables, and noisy variables may be removed from the dataset.

To further reduce the number of variables, the relative contribution of each of the variables in the data set in predicting the target value may be calculated, and only the variables with the most influence may be kept in the dataset.

After the dataset is prepared and tagged, the AI model may be trained. A hyperparameter autotuning engine may be used to tune the hyperparameters of the AI models. The number and type of hyperparameters depend on the type of model. For multi-layer perceptron (MLP) models, hyperparameters include numbers of layers, size of layers, number of nodes, number of hidden units, activation function, learning rate, momentum, etc. In one embodiment, the hyperparameter autotuning engine may comprise multiple GPUs that generate many variations of a model, each with different hyperparameters. The variations may then be tested or evaluated to determine the best or most acceptable model.

Embodiments of the subject matter and the functional operations described in this specification can be implemented in one or more of the following: digital electronic circuitry; tangibly-embodied computer software or firmware; computer hardware, including the structures disclosed in this specification and their structural equivalents; and combinations thereof. Such embodiments can be implemented as one or more modules of computer program instructions encoded on a non-transitory medium for execution by a data processing apparatus. The computer storage medium can be one or more of: a machine-readable storage device, a machine-readable storage substrate, a random or serial access memory device, and combinations thereof.

As used herein, the term "data processing apparatus" comprises all kinds of apparatuses, devices, and machines for processing data, including but not limited to, a programmable processor, a computer, and/or multiple processors or computers. Exemplary apparatuses may include special purpose logic circuitry, such as a field programmable gate array ("FPGA") and/or an application specific integrated circuit ("ASIC"). In addition to hardware, exemplary apparatuses may comprise code that creates an execution environment for the computer program (e.g., code that constitutes one or more of: processor firmware, a protocol stack, a database management system, an operating system, and a combination thereof).

The term "computer program" may also be referred to or described herein as a "program," "software," a "software application," a "module," a "software module," a "script," or simply as "code." A computer program may be written in any programming language, and it can be deployed in any form, including as a standalone program or as a module, component, subroutine, or other unit suitable for use in a computing environment. A computer program can be deployed and/or executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as but not limited to an FPGA and/or an ASIC.

Computers suitable for the execution of the one or more computer programs include, but are not limited to, general purpose microprocessors, special purpose microprocessors, and/or any other kind of central processing unit ("CPU"). Generally, CPU will receive instructions and data from a read only memory ("ROM") and/or a random access memory ("RAM").

Computer readable media suitable for storing computer program instructions and data include all forms of nonvolatile memory, media, and memory devices. For example, computer readable media may include one or more of the following: semiconductor memory devices, such as ROM or RAM; flash memory devices; magnetic disks; magneto optical disks; and/or CD-ROM and DVD-ROM disks. The processor and the memory can be supplemented by, or incorporated in, special purpose logic circuitry.

To provide for interaction with a user, embodiments may be implemented on a computer having any type of display device for displaying information to a user. Exemplary display devices include, but are not limited to one or more of: projectors, cathode ray tube ("CRT") monitors, liquid crystal displays ("LCD"), light-emitting diode ("LED") monitors, and/or organic light-emitting diode ("OLED") monitors. The computer may further comprise one or more input devices by which the user can provide input to the computer. Input devices may comprise one or more of: keyboards, pointing devices (e.g., mice, trackballs, etc.), and/or touch screens. Moreover, feedback may be provided to the user via any form of sensory feedback (e.g., visual feedback, auditory feedback, or tactile feedback). A computer can interact with a user by sending documents to and receiving documents from a device that is used by the user (e.g., by sending web pages to a web browser on a user's client device in response to requests received from the web browser).

Embodiments of the subject matter described in this specification can be implemented in a computing system that includes one or more of the following components: a backend component (e.g., a data server); a middleware component (e.g., an application server); a frontend component (e.g., a client computer having a graphical user interface ("GUI") and/or a web browser through which a user can interact with an implementation of the subject matter described in this specification); and/or combinations thereof. The components of the system can be interconnected by any form or medium of digital data communication, such as but not limited to, a communication network. Non-limiting examples of communication networks include a local area network ("LAN") and a wide area network ("WAN"), e.g., the Internet.

The computing system may include clients and/or servers. The client and server may be remote from each other and interact through a communication network. The relationship of client and server arises by virtue of computer programs running on the respective computers and having a client-server relationship to each other.

Various embodiments are described in this specification, with reference to the detailed discussed above, the accompanying drawings, and the claims. Numerous specific details are described to provide a thorough understanding of various embodiments. However, in certain instances, well-known or conventional details are not described in order to provide a concise discussion. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the embodiments.

The embodiments described and claimed herein and drawings are illustrative and are not to be construed as limiting the embodiments. The subject matter of this specification is not to be limited in scope by the specific examples, as these examples are intended as illustrations of several aspects of the embodiments. Any equivalent examples are intended to be within the scope of the specification. Indeed, various modifications of the disclosed embodiments in addition to those shown and described herein will become apparent to those skilled in the art, and such modifications are also intended to fall within the scope of the appended claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

All references including patents, patent applications and publications cited herein are incorporated herein by reference in their entirety and for all purposes to the same extent as if each individual publication or patent or patent application was specifically and individually indicated to be incorporated by reference in its entirety for all purposes.

What is claimed is:

1. A processor-implemented method for automating one or more product or policy administration systems, the method comprising:
    analyzing, using a processor, each administration system to determine data structures that are common between the systems;
    generating, using the processor, a shared database structure, the shared database structure based on the common data structures;
    automating, using the processor, at least one shared process using at least one artificial intelligence (AI) technique, one robotic process automation (RPA) technique, or a combination of at least one AI technique and at least one RPA technique; and
    automating, using the processor, at least one additional process.

2. The method of claim 1, wherein the AI technique comprises creating at least one AI model.

3. The method of claim 1, wherein the AI technique comprises creating at least one natural language processing model or at least one natural language understanding model.

4. The method of claim 1, wherein the AI technique comprises creating at least one natural language generation model.

5. A system comprising one or more processors and one or more storage devices storing instructions that when executed by the one or more processors cause the one or more processors to perform operations comprising:
    analyzing, using a processor, each administration system to determine data structures that are common between the systems;
    generating a shared database structure, the shared database structure based on the common data structures;
    automating at least one shared process using at least one artificial intelligence (AI) technique, one robotic process automation (RPA) technique, or a combination of at least one AI technique and at least one RPA technique; and
    automating at least one additional process.

6. The system of claim 5, wherein the AI technique comprises creating at least one AI model.

7. The system of claim 5, wherein the AI technique comprises creating at least one natural language processing model or at least one natural language understanding model.

8. The system of claim 5, wherein the AI technique comprises creating at least one natural language generation model.

* * * * *